US009736730B2

(12) United States Patent
Halepovic et al.

(10) Patent No.: US 9,736,730 B2
(45) Date of Patent: Aug. 15, 2017

(54) WIRELESS VIDEO DOWNLOAD RATE OPTIMIZATION

(71) Applicant: AT&T INTELLECTUAL PROPERTY I, L.P., Atlanta, GA (US)

(72) Inventors: Emir Halepovic, Somerset, NJ (US); Kadangode K Ramakrishnan, Riverside, CA (US); Jeffrey Erman, Morristown, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 14/933,750

(22) Filed: Nov. 5, 2015

(65) Prior Publication Data

US 2017/0134987 A1 May 11, 2017

(51) Int. Cl.
*H04H 20/30* (2008.01)
*H04W 28/16* (2009.01)
*H04N 21/61* (2011.01)

(52) U.S. Cl.
CPC ........ *H04W 28/16* (2013.01); *H04N 21/6131* (2013.01)

(58) Field of Classification Search
CPC combination set(s) only.
See application file for complete search history.

(56) References Cited

U.S. PATENT DOCUMENTS

| | | |
|---|---|---|
| 7,925,770 B1 | 4/2011 | Hamel et al. |
| 8,090,865 B2 | 1/2012 | Hamel et al. |
| 8,145,783 B2 | 3/2012 | Hamel et al. |
| 8,533,353 B2 | 9/2013 | Hamel et al. |
| 8,649,669 B2 | 2/2014 | Braness et al. |
| 8,843,656 B2 | 9/2014 | Gahm et al. |
| 2005/0213586 A1 | 9/2005 | Cyganski et al. |
| 2011/0096828 A1* | 4/2011 | Chen ............... H04N 21/23106 375/240.02 |
| 2014/0025835 A1 | 1/2014 | Gahm et al. |
| 2014/0281000 A1 | 9/2014 | Dattagupta et al. |

OTHER PUBLICATIONS

Zhang et al. "QoE-Driven Cache Management for HTTP Adaptive Bit Rate Streaming Over Wireless Networks", Oct. 2013.
Erman et al. "Over the top video: the gorilla in cellular networks", 2011.

* cited by examiner

*Primary Examiner* — Kieu Oanh T Bui
(74) *Attorney, Agent, or Firm* — Greenblum & Bernstein, P.L.C.

(57) ABSTRACT

Wireless video download rates are optimized by receiving, at a system with a computer that includes a processor and memory, a request to provide a piece of video content over a wireless network. The processor of the computer is used to determine whether to provide the video content at a first option that is as soon as possible or at a second option over a specified interval T. The interval T is calculated as a time for a destination device to download the video content at a rate level higher than encoding for the video content requires. Upon determining to provide the video content over the interval T, the video content is provided over the wireless network over the interval T to a client device that requested the piece of video content.

20 Claims, 9 Drawing Sheets

Computer**

WIRELESS VIDEO DOWNLOAD RATE OPTIMIZATION

BACKGROUND

1. Field of the Disclosure

The present disclosure relates to the field of wireless communications. More particularly, the present disclosure relates to optimizing wireless video download rates for video content downloaded over wireless communication networks.

2. Background Information

Since wireless data was first made widely available issues have arisen with network availability and network congestion. Many different types of solutions have been implemented in order to improve network availability and reduce network congestion. Existing solutions so far have included infrastructure buildout, development of wireless communication standards such as long-term evolution (LTE), and advancement of mobile device capabilities such as the ability to communicate over local wireless fidelity (WiFi) networks.

Conventionally, adaptive bit rate is used to provide wireless content downloads as fast as possible to a requesting client. However, conventionally the requesting clients estimate available bandwidth by comparing received data amounts with reception times. For a variety of reasons, client estimates of available bandwidth may be inaccurate, such as when client devices switch from idle to active in a long-term evolution (LTE) network.

DETAILED DESCRIPTION

In view of the foregoing, the present disclosure, through one or more of its various aspects, embodiments and/or specific features or sub-components, is thus intended to bring out one or more of the advantages as specifically noted below.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an" or "the", is not to be construed as limiting the element to the singular.

Figure 1:
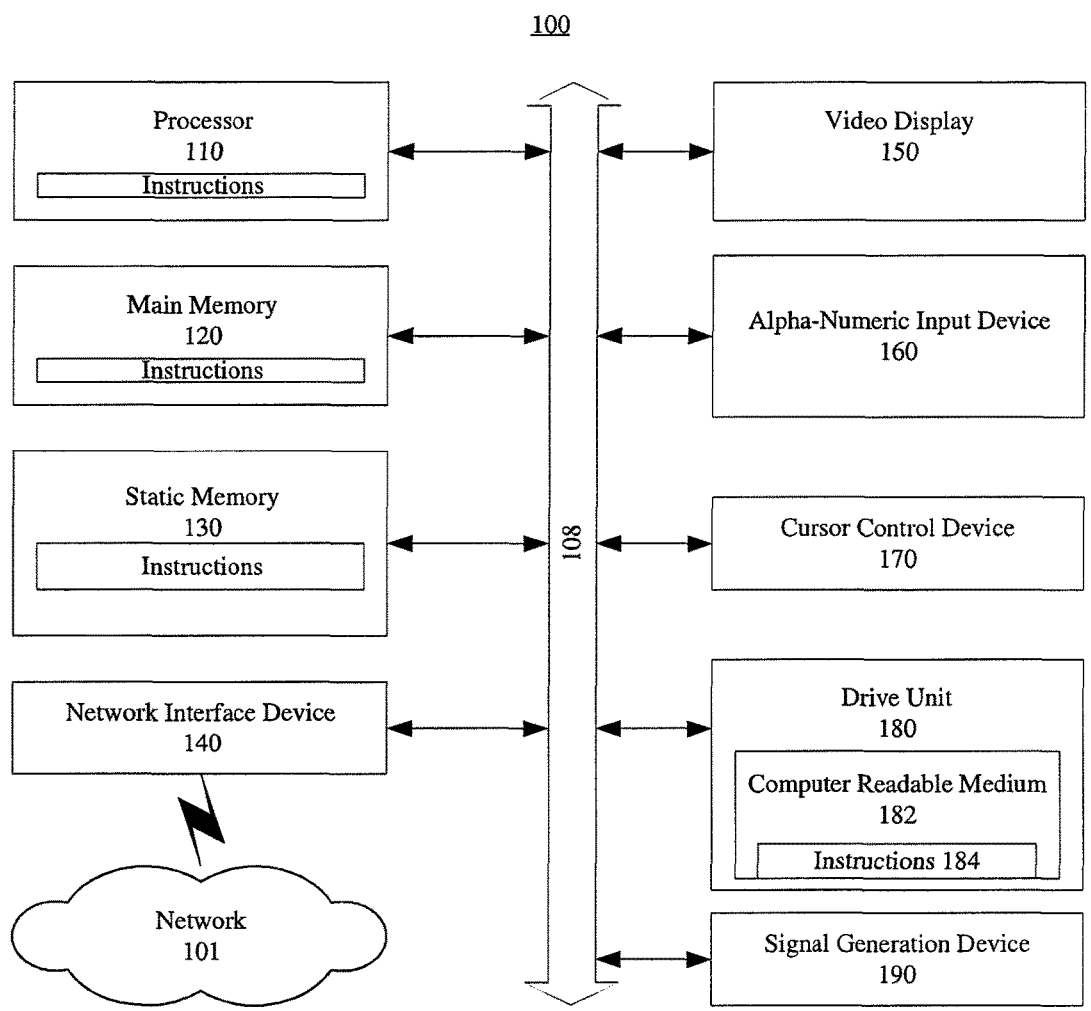
FIG. 1 shows an exemplary general computer system that includes a set of instructions for wireless video download rate optimization, according to an aspect of the present disclosure.

FIG. 1 is an illustrative embodiment of a general computer system, on which a method of wireless video download rate optimization can be implemented, and which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system 100 may operate in the capacity of a server or as a client user computer in a server-client user network environment, or as a peer computer system in a peer-to-peer (or distributed) network environment. The computer system 100 can also be implemented as or incorporated into various devices, such as a stationary computer, a mobile computer, a personal computer (PC), a laptop computer, a tablet computer, a wireless smart phone, a set-top box (STB), a personal digital assistant (PDA), a global positioning satellite (GPS) device, a communications device, a control system, a camera, a web appliance, a network router, switch or bridge, video server, optimization server, cell tower, or any other machine capable of executing a set of instructions (sequential or otherwise) that specify actions to be taken by that machine. The computer system 100 can be incorporated as or in a particular device that in turn is in an integrated system that includes additional devices. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 includes a processor 110. A processor for a computer system 100 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor is an article of manufacture and/or a machine component. A processor for a computer system 100 is configured to execute software instructions in order to perform functions as described in the various embodiments herein. A processor for a computer system 100 may be a general purpose processor or may be part of an application specific integrated circuit (ASIC). A processor for a computer system 100 may also be a microprocessor, a microcomputer, a processor chip, a controller, a microcontroller, a digital signal processor (DSP), a state machine, or a programmable logic device. A processor for a computer system 100 may also be a logical circuit, including a programmable gate array (PGA) such as a field programmable gate array (FPGA), or another type of circuit that includes discrete gate and/or transistor logic. A processor for a computer system 100 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 100 includes a main memory 120 and a static memory 130 that can communicate with each other via a bus 108. Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A memory described herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, bluray disk, or any other form of storage medium known in the art. Memories may be volatile or non-volatile, secure and/or encrypted, unsecure and/or unencrypted.

As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard/virtual keyboard or touch-sensitive input screen or speech input with speech recognition, and a cursor control device 170, such as a mouse or touch-sensitive input screen or pad. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. Sets of instructions 184 can be read from the computer-readable medium 182. Further, the instructions 184, when executed by a processor, can be used to perform one or more of the methods and processes as described herein. In a particular embodiment, the instructions 184 may reside completely, or at least partially, within the main memory 120, the static memory 130, and/or within the processor 110 during execution by the computer system 100.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

The present disclosure contemplates a computer-readable medium 182 that includes instructions 184 or receives and executes instructions 184 responsive to a propagated signal; so that a device connected to a network 101 can communicate voice, video or data over the network 101. Further, the instructions 184 may be transmitted or received over the network 101 via the network interface device 140.

A video stream for a piece of video content may be provided to a smart phone typically by any of 5 (five) encoding levels for smartphones. Additional encoding levels may be provided for tablets and larger devices. As described herein, video content can be provided at an encoding level selected as the required coding level for the video content, or higher, as an alternative to providing the video content as fast as possible using conventional adaptive bit rate.

Figure 2:
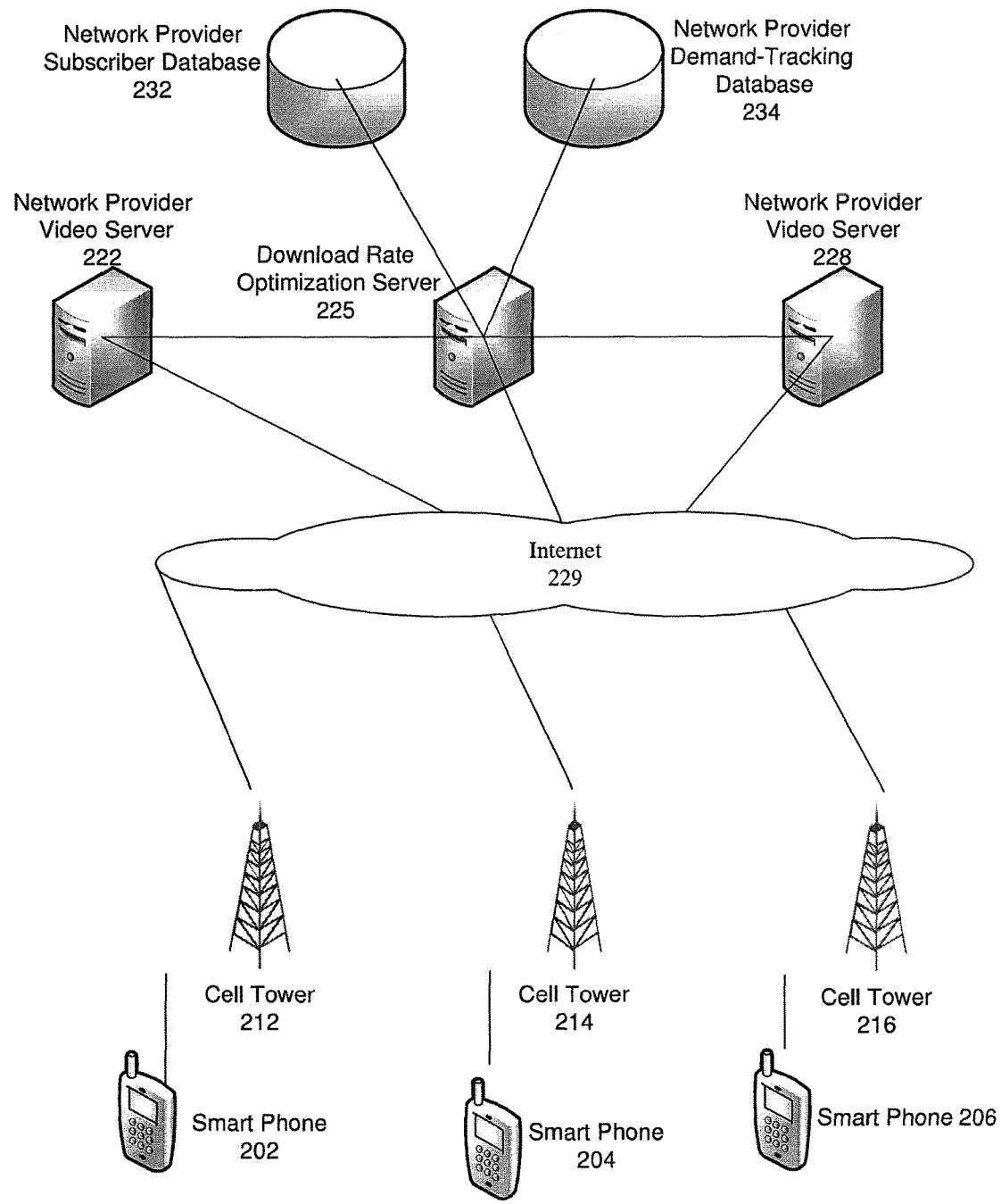
FIG. 2 shows an exemplary network for wireless video download rate optimization, according to an aspect of the present disclosure.

FIG. 2 shows an exemplary network for wireless video download rate optimization, according to an aspect of the present disclosure. In FIG. 2, a download rate optimization server 225 optimizes download rates for users using smart phones 202, 204, 206 to request video content. As described herein, the optimization may be based on one or more of a variety of factors including network demand, the characteristics of each smart phone 202, 204, 206, characteristics of subscriptions subscribed to by subscribers using each smart phone 202, 204, 206 and more.

In FIG. 2, the smart phones 202, 204, 206 communicate via cell towers 212, 214, and 216 respectively. The cell towers 212, 214, 216 are representative of towers that transmit and receive cellular and data signals for telecommunications carriers such as AT&T®. The cell towers 212, 214 and 216 are merely representative intermediaries that carry the transmitters, receivers and transceivers by which wide area network wireless services are provided to subscribers with smart phones 202, 204, and 206. That is, the cell towers 212, 214, 216 may individually or all be supplemented or replaced with antennas placed on buildings in urban areas, on heights in suburban and rural areas, and even by communications satellites in space in some cases. The cell towers 212, 214, 216 may provide communications service for one telecommunications carrier, or on behalf of several telecommunications carriers.

The cell towers 212, 214, 216 are each also connected with the internet 229, which for the purposes of FIG. 2 can be considered mainly as including broadband wireline capabilities in order to bring signals to and from the wireless networks implemented by the cell towers 212, 214, 216. For the present application, the wireless signals of interest are wireless video signals which may come in a variety of formats and from a variety of sources.

In FIG. 2, a download rate optimization server 225 optimizes download rates as described herein. The download rate optimization server 225 is a centralized server that optimizes download rates in order to optimize video downloads from network provider video server 222 and network provider video server 228. In FIG. 2, the download rate optimization server 225 is provided by the telecommunications carrier that provides the cell towers 212, 214, 216, and uses information such as subscriber information from network provider subscriber database 232 and demand information from network provider demand-tracking database.

The network provider subscriber database 232 stores information on subscribers using smart phones 202, 204, 206 as well as information on the smart phones 202, 204, 206. Subscriber information may include demographic information such as age, gender, ethnicity, home area, and income. Subscriber information may also include usage and subscription information such as a subscription type, billing information, and usage information and details such as volume of usage, communication counterparties, and communication dates and times. Smart phone information may include manufacturer, age, processing capabilities, display capabilities, operating system, memory, applications selected for use, equipment unique identification numbers (of any type), and so on. The information from network provider subscriber database 232 may be used to optimize download rates to smart phones 202, 204, 206 based on subscriber information and/or smart phone information.

The network provider demand-tracking database 234 may track network demand information for the wireless networks provided by cell towers 212, 214, 216. The demand-tracking database 234 may track historical demand information and real-time demand information. Historical information may include trends and patters such as usage for different hours of the day, days of the week, weeks of the year, holidays and for special irregular events. Real-time demand information may include real-time information such as how many users are communicating via each cell tower 212, 214, 216 at a particular moment using data signals, and how much data they are demanding and have demanded (recently) for download. In this way, a network provider can estimate how much bandwidth is available and how much is being used in an area in which one or more of the cell towers 212, 214, 216 (or other transceiver stations) exists. The information from network provider demand-tracking database 232 may be used to optimize download rates to smart phones 202, 204, 206 based on historical or real time demand information.

In FIG. 2, the video content requested via smart phones 202, 204, 206 comes from the network provider video servers 222, 228. However, in other embodiments video content can be sourced from proxy video servers from third parties, including third party entities that independently provide video content (e.g., on demand) to the users of the smart phones 202, 204, 206. Network provider and/or third party video sources can provide free or pay video, per-item video, or per-time-period (subscription) video. Third party video services can coordinate how and when video is provided with the network carriers that ultimately carry the video to the smart phones 202, 204, and 206.

In FIG. 2, the download rate optimization server 225 receives a request to provide a piece of video content over a wireless network. However, in other embodiments, a different server (not shown) may actually receive such requests and coordinate the video download with download rate optimization server 225. The download rate optimization server 225 determines how to provide the video content. As a first option, the download rate optimization server 225 may determine to provide the video content as soon as possible. As a second option, the download rate optimization server 225 may determine to provide the video content over a specified interval T. The specified interval T can be calculated as a time for a destination device to download the video content at a rate level higher than encoding for the video content requires. Upon determining to provide the video content over the interval T, the video content can be provided from the network provider video servers 222, 228 via the internet to the cell towers 212, 214, 216 and then wirelessly over the wireless network over the interval T to the requesting smart phone 202, 204, 206.

Video that can be downloaded over wireless networks described herein may come in a variety of image and video formats. Image formats include GIF 87a (still images), GIF89a (animated images), WBMP (Wireless bitmap still images), BMP (still images), PNG (still images), and WBMP (animated images). Video formats include H.263 and MPEG4.

Bit rates for video downloaded over wireless networks can also vary. For example, a streaming SD rate is 533 kbps, and a streaming HD rate is 2000 kbps. Additionally, video bit rates can be, e.g., 1.05 Mbps (1,050 kbps), 1.9 Mbps (1,900 kbps), and 3.0 Mbps (3,000 kbps). Adaptive bit rates can also be used in accordance with the present disclosure for HTTP networks. The internet is an example of a large distributed HTTP network. The adaptiveness refers to the connection speed which can be adapted as needed, such as using what the client device can handle in terms of processing (CPU) and memory ability. Video quality can be adjusted using the adaptive bit rates.

Figure 3:
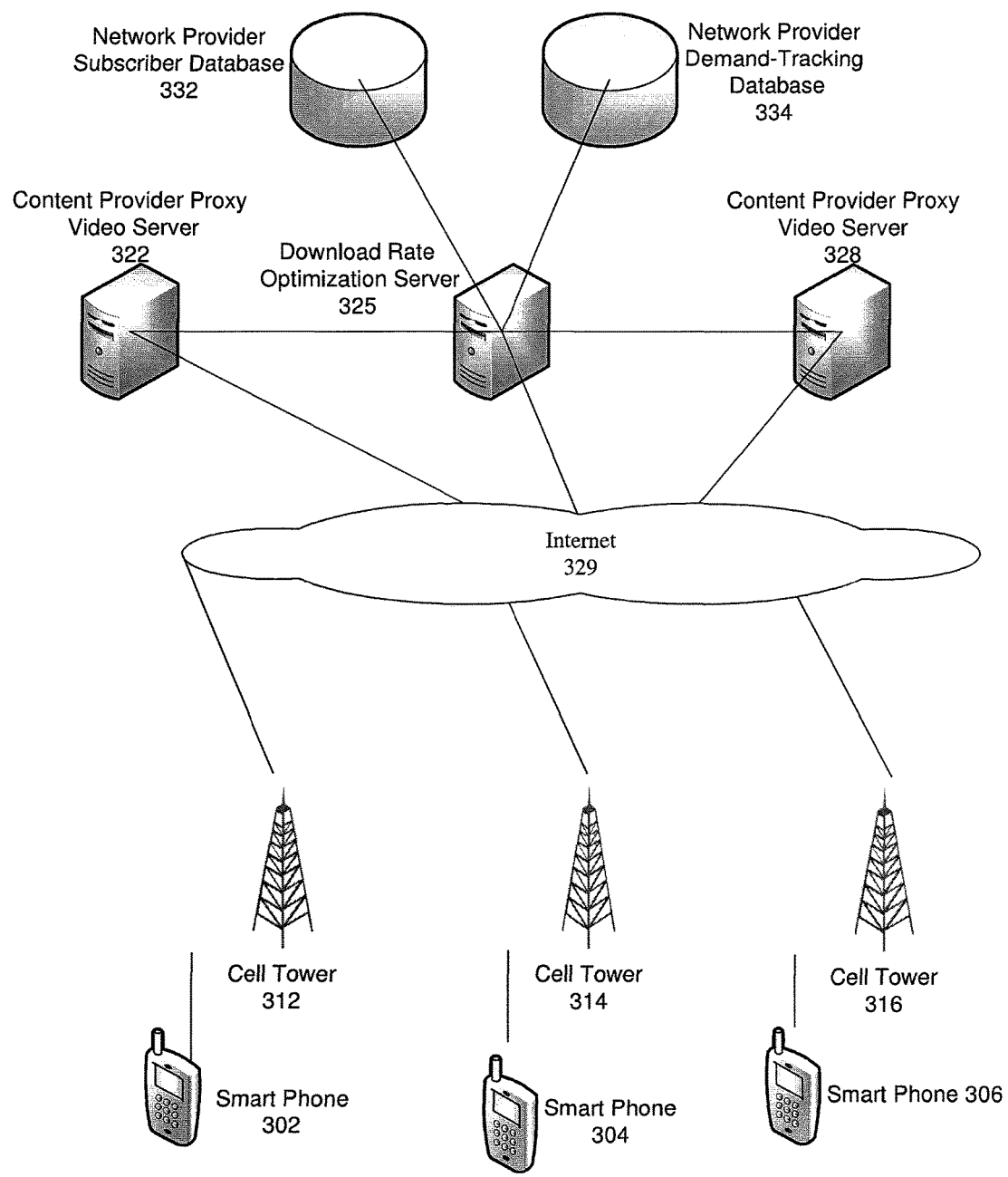
FIG. 3 shows an exemplary network for wireless video download rate optimization, according to an aspect of the present disclosure.

FIG. 3 shows an exemplary network for wireless video download rate optimization, according to an aspect of the present disclosure. In FIG. 3, video content available for download is provided by proxies such as third-party video sources. Therefore, the telecommunications carriers that actually provide the wireless networks described herein coordinate with the third-party video sources in order to implement the features described herein. In FIG. 3, the download rate optimization server 325 may be provided by the telecommunications carrier that provides cell towers 312, 314, 316, or may be provided by the third-party video sources that provide content provider proxy video server 322 and content provider proxy video server 328. Of course, a wireless telecommunication carrier may provide video content to subscribers from any number of proxy third party video content sources. As noted above, however, the download rate optimization may be performed by either the wireless telecommunication carrier or the third party video content sources.

In FIG. 3, the download rate optimization server 325 accesses information from the network provider subscriber database 332 and network provider demand-tracking database 334. Each database stores data that can be used to dynamically optimize the download rate optimization, even if the optimization is carried out by the third party video content source. As in FIG. 2, network provider subscriber database 332 stores demographic information about a user of a requesting client mobile device, as well as characteristics of the requesting client mobile device. Similarly, the network provider demand-tracking database 334 is provided by the wireless telecommunications carrier and stores both historical and real-time demand data that reflects demand that would affect the download rate optimization. The demand data may be data for each cell tower or similar transceiver, for a geographical area covered by part or all of one or more cell towers and/or similar transceiver. The demand data may be the number of users communicating via a wireless data network provided by the cell towers and/or other transceivers, or may be the aggregated amount of requested data being provided over such a wireless data network for a time or period.

In FIG. 3, each of the content provider proxy video servers 322 and 328 and the download rate optimization server 325 communicate with representative cell towers 312, 314, 316 via the internet 329. In turn, the cell towers 312, 314, 316 provide a wireless communications network access to smart phones 302, 304, 306. The wireless communications network access that is provided may be both voice and data.

In embodiments described herein, a network video server 222, 228 or proxy video server 322, 328 delivers video content. The video content is delivered in chunks either as fast as possible or over an interval T. The interval T, when used for the delivery, can be set by the client (e.g., smart phone 202, 204, 206, 302, 304, 306) requesting the video content, or the network video server 222, 228, or the proxy video server 322, 328. The option to use either an interval T or "as fast as possible" can be agreed upon by the client (e.g., smart phone 202, 204, 206, 302, 304, 306), the network video server 222, 228, or the proxy video server 322, 328. Further, the selection option for the rate level can be enforced by the proxy video server 322, 328, or by the client (e.g., smart phone 202, 204, 206, 302, 304, 306) or network video server 222, 228 when there is no proxy video server 322, 328. The interval T is calculated as a time to download the video content at a rate level higher (i.e., faster) than the encoding for the requested video content requires. Of course, this implies knowledge of the required encoding rate level for video content, so this may have to be provided from the video content source when the video content source is not itself setting the interval T, unless the required encoding rate level is of a type already known by the requesting client/smart phone or the network video server 222, 228.

Different content providers and network carriers may have differing numbers of possible encoding rate levels for content. In practice, different video content providers use different numbers of encoding rates to encode video content. For example, a particular content provider may use up to 7 different encoding rates for live television video content and up to 6 different encoding rates for on-demand video content. Another particular content provider may use up to 10 different rates for on-demand video content. A content provider may use only up to 3 or 4 encoding rates when delivering video over cellular network. Generally, content providers use between three (3) and fifteen (15) total different encoding rates.

The methodologies described herein take the encoding rate set by one such content provider as the "required" rate to provide the video based, for example, on estimates of bandwidth available to a requesting device, and set the delivery rate one level higher. The required encoding rate is dynamically determined and then the delivery is set to one rate level higher so as to optimize the future selected encoding rates by checking for additional bandwidth. The dynamic determination of the required encoding rate may take into account the quality required for the requested video, the network the requesting device is using, and even device parameters of the requesting device.

With faster delivery, the requesting smart phone can increase its estimate of bandwidth availability which can help ensure the faster deliver or even an increase in delivery. The network video server 222, 228 or proxy video server 322, 328 can vary how much higher than the requested rate level to set, depending on factors such as demand, client profile etc.

The network video content server 222, 228 or proxy video content server 322, 328 calculating and using the interval T can avoid a problem where a requesting client cannot properly estimate bandwidth such as when the client downloads and idles repeatedly in LTE and UMTS. One other aspect is that a TCP feature of triggering a slow start to resume can be turned off by the network video content server 222, 227 or proxy video content server 322, 328 in lieu of using the period T. This can result in a smoother delivery with fewer bursts. That is, specifying the interval T in advance can ensure that the video content is delivered throughout the interval T rather than in bursts as fast as possible. In practice, this helps avoid gaps in delivery that can result (for example under transmission control protocol (TCP)) in the receiving client switching to an idle state that causes delays when switching back to an active state.

Moreover, the bitrates can be derived for a particular piece of content from a source that does not publish bitrates. The delivery server can review the URLs used for the content, and identify which carry audio and then derive video duration from the information in the headers for the file (e.g., such as file size). The duration is then used to derive encoding bitrate of each video encoding layer, so that even when the source does not provide the information, the server that calculates T can calculate T and a bitrate to deliver the content.

Figure 4:
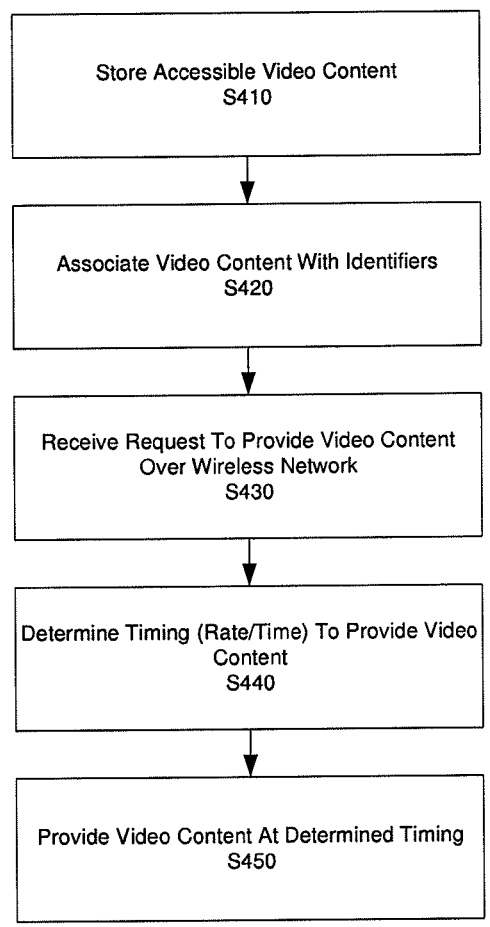
FIG. 4 shows an exemplary method for wireless video download rate optimization, according to an aspect of the present disclosure.

FIG. 4 shows an exemplary method for wireless video download rate optimization, according to an aspect of the present disclosure. At S410, accessible video content is stored. The accessible video content can be stored by or on behalf of a wireless telecommunications company, or by a third party content provider that provides video content in cooperation with wireless telecommunications companies. A third party content provider may provide content as a service for content originators such as television studios that record content.

At S420, the video content is associated with identifiers. The identifiers may be information that helps users find the video content, and may include information such as:
  a title
  a creation date
  a publication date
  tags that describe the nature of the data
  information on who appears in the video content
  a location where the video content is recorded
  a video coding format of the video content (e.g., MPEG-2 Part 2, MPEG-4 Part 2, H.264 (MPEG-4 Part 10), HEVC, Theora, Dirac, RealVideo RV40, VP8, and VP9)
  a file type of the video content (e.g., .MOV, MPEG4, MP4, .AVI, .WMV, .MPEGPS, .FLV, 3GPP, WebM)

At S430, a request is received to provide the video content over a wireless network. The request may be received from a user using a mobile device such as a dual mode smart phone or a tablet computer that communicates via a wireless telecommunication data network. The request may be received as an internet request at an internet address via a browser, or may be received directly via an application specific to a content provider and installed on the mobile device. In any event, the video content provider will coordinate with the mobile device to provide the requested video content via the wireless telecommunication data network.

At S440, a determination is made as to the timing (download rate) to provide the video content. The determination may be made by the wireless telecommunication network provider and conveyed to the third party content provider, or may be implemented solely by the wireless telecommunication network provider. At S450, the video content is provided at that determined timing. As described above and below, the determined timing is determined based on one or more factors such as network demand and/or a profile of the requesting mobile device. The determined timing may also be determined based on a rate level required for encoding the video content. Further, in some instances as in conventional systems, a determined timing can still be based on determinations made by the requesting mobile device such as an estimate of available bandwidth based on reception rates for data being received. That is, as described herein, conventional adaptive bit rate streaming works by detecting a user's bandwidth in real time and adjusting the quality of a video stream accordingly to provide the video stream as fast as possible as in option 1 described herein. The receiving device detects bandwidth using the achieved throughput during download (for example, received data amount divided by reception time).

Figure 5:
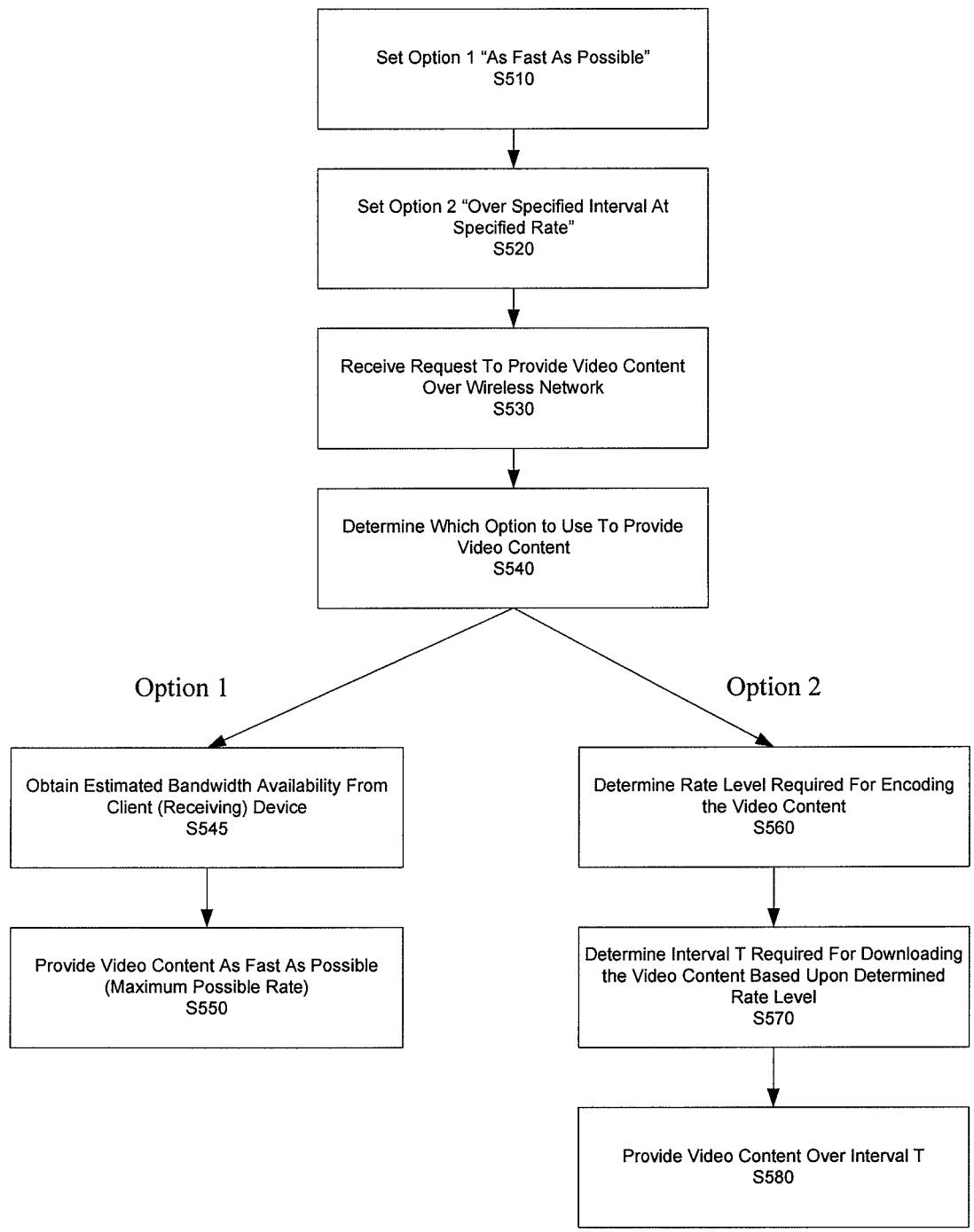
FIG. 5 shows an exemplary method for wireless video download rate optimization, according to an aspect of the present disclosure.

FIG. 5 shows an exemplary method for wireless video download rate optimization, according to an aspect of the present disclosure. In FIG. 5, a system responsible for implementing download rates sets an internal option 1 at S510 to provide video content over a wireless telecommunications network as fast as possible. The system sets an internal option 2 at S520 to provide video content over a specified interval T at a specified rate. The requesting client can request to receive a chunk of video content at a specified interval T calculated by the requesting client. However, the interval T can also be computed by the server or the proxy once the decision to use the interval T is made, and/or once agreement is reached between the client and the server and/or the proxy to use the interval T.

At S530, a request to provide video content over the wireless telecommunications network is received. At S540, a determination is made whether to provide the requested video content via option 1 or option 2. At S545 (Option 1) estimated bandwidth availability is obtained from the requesting client device. At S550, the requested video content is provided as fast as possible (maximum possible rate) to the requesting client device based on the estimated bandwidth availability received from the requesting mobile device.

At S560, the rate level required for encoding the video content is determined (Option 2). At S570, the interval T required for downloading the video content based upon the determined rate level is determined. The interval T is the amount of time required to download a file of a known size (e.g., X) divided by the determined rate level (e.g., Y). At S580, the video content is provided over the wireless telecommunication network over the interval T.

Figure 6:
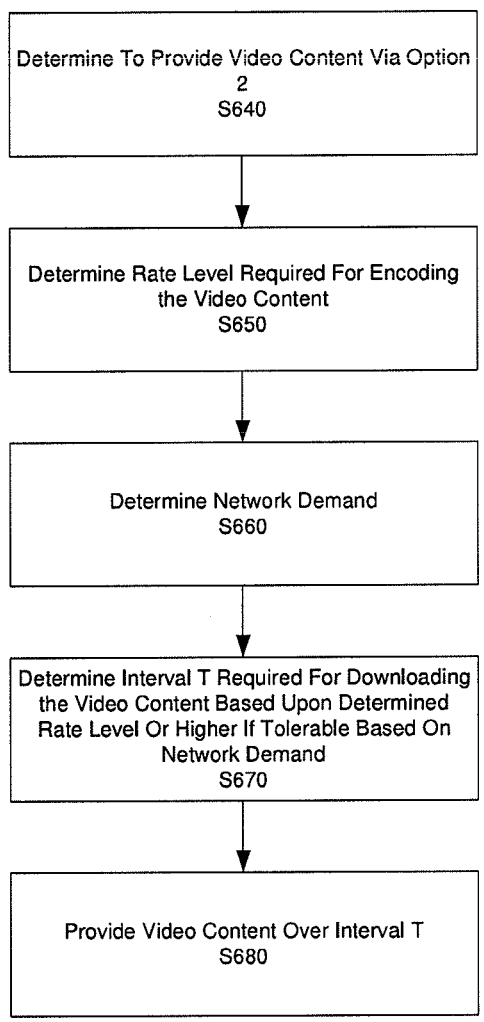
FIG. 6 shows an exemplary method for wireless video download rate optimization, according to an aspect of the present disclosure.

FIG. 6 shows an exemplary method for wireless video download rate optimization, according to an aspect of the present disclosure. In FIG. 6, a determination to provide video content via option 2 is made at S640. At S650, the rate level required for encoding the video content is determined. At S660, network demand is determined. At S670, an interval T is determined. Interval T as described herein is the interval required for downloading the video content based upon the rate level determined at S650. Interval T may be at a high rate level than that determined at S650 if the higher rate level (corresponding to a smaller interval T) is tolerable based on network demand. At S680, the video content is provided over interval T.

Additionally, a next-highest rate level than that determined at S650 may be used as a default in order to ensure better, faster service to customers. In this case, the interval T would correspond to a rate level higher than that required for encoding the video content. That is, the interval T would be the time required to download an item of video content of a known size at a particular rate level determined at S650 or offset (e.g., by one level) from the rate level determined at S650.

Figure 7:
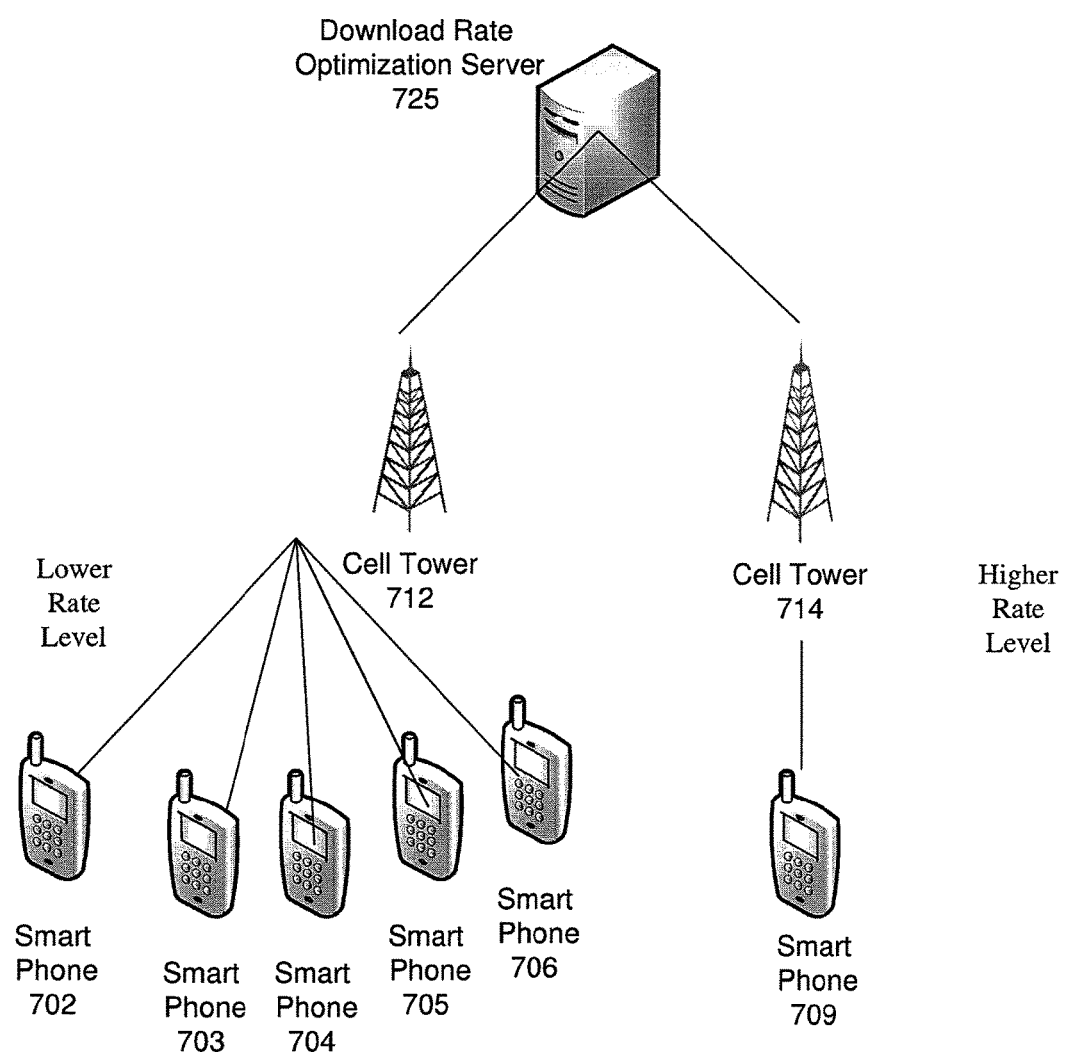
FIG. 7 shows an exemplary network for wireless video download rate optimization, according to an aspect of the present disclosure.

FIG. 7 shows an exemplary network for wireless video download rate optimization, according to an aspect of the present disclosure. In FIG. 7, a download rate optimization server 725 communicates with cell towers 712 and 714 via, for example, the internet. Cell tower 712 provides a wireless telecommunications network service to five smart phones 702, 703, 704, 705, 706. Cell tower 714 provides a wireless telecommunications network service to one smart phone 709. The download rate optimization server 725 can obtain information of the network demand based on, for example, the number of devices operating via a cell tower 712, 714, the total data demanded by devices operating via a cell tower 712, 714 in recent minutes or historically. The download rate optimization server 725 can then provide requested video content via cell tower 712 at a lower rate than video content provided via cell tower 714, in order to reflect the relative differences in network demand on the different cell towers 712, 714.

As described, the network demand can be determined using any of the number of devices operating via a particular cell tower or the aggregated data demanded by devices operating via a particular cell tower. Network demand for data services via a particular cell tower may be determined in real time periodically, such as every 5 seconds, every 30 seconds, every 1 minute, every 2 minutes, every 5 minutes, every 15 minutes, every 30 minutes or every hour. Network demand may also be determined in advance, using historical data of demand imposed for a particular time of day, day of week, calendar day, particular event, and so on. Network demand can also be determined for a group of cell towers rather than just one cell tower. Network demand may also be determined based on requests made to the particular download rate optimization server 725.

In any event, the video content provided via cell tower 712 will be provided at a lower rate in FIG. 7 than video content provided via cell tower 714. This ability to vary download rate levels is representative of the variations in rate levels that can be implemented dynamically, in real time, using the teachings of the present disclosure.

Figure 8:
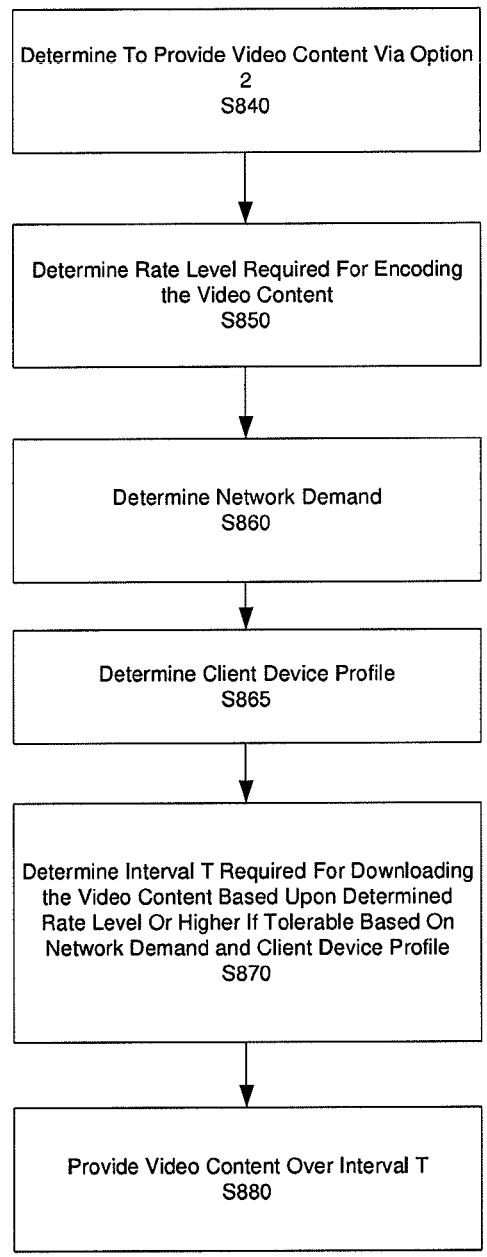
FIG. 8 shows an exemplary method for wireless video download rate optimization, according to an aspect of the present disclosure.

FIG. 8 shows an exemplary method for wireless video download rate optimization, according to an aspect of the present disclosure. At S840, a determination is made to provide video content via option 2. At S850, a rate level required for encoding video content is determined. At S860, network demand is determined. At S865, a profile of the requesting client device is determined. The profile of the requesting device may include, for example, a device manufacturer, a device model, a device processing capability, a device memory capability, a device operating system, applications installed on the device either by default or after purchase, and even a telecommunications service provider that provides telecommunications services to the device as a subscription service (when the determination is not being made by the telecommunications service provider).

A S870, an interval T is determined. The interval T is at least the time required for downloading the video content based upon the determined rate level or a higher rate level (if tolerable) based upon the network demand and/or the client device profile. Of course, the interval T may be more than the minimal time required to download video content at a determined rate, such as if an additional threshold is "built in" as a cushion in the event of miscalculations. At S880, video content is provided over the interval T.

Figure 9:
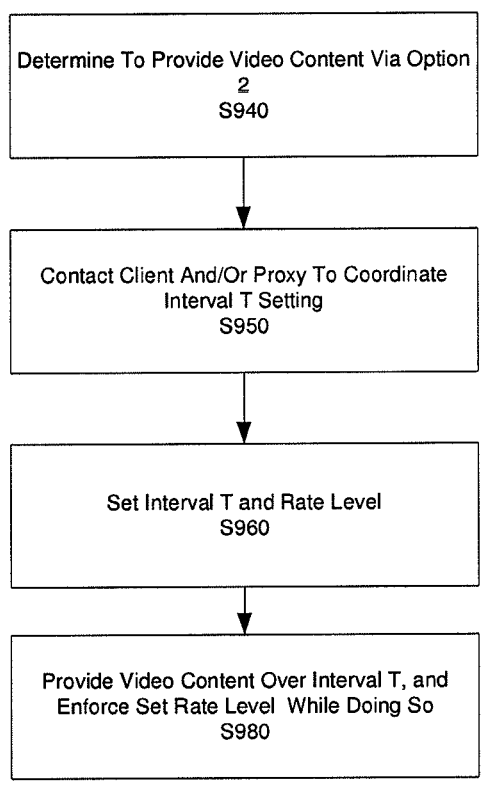
FIG. 9 shows an exemplary method for wireless video download rate optimization, according to an aspect of the present disclosure.

FIG. 9 shows an exemplary method for wireless video download rate optimization, according to an aspect of the present disclosure. In FIG. 9, a determination is made to provide video content via option 2 at S940. At S950, the system making the determination at S940 contacts the requesting client or a third-party proxy content provider to coordinate setting the interval T. The system, the requesting client, and/or the third party proxy content can individually or jointly agree on which system or device will make the determination, and then the interval T and download rate level are set at S960. At S980, the video content is provided over interval T, and the rate level is enforced by the content provider or the wireless telecommunications system while the video content is provided.

Accordingly, wireless video download rate optimization enables a wireless wide area network provider, such as a long-term evolution (LTE) or long-term evolution advanced services provider, to dynamically vary download rates in a manner that optimizes services for users while optimizing se of the wireless wide area network provided by the wireless wide area network provider. The present disclosure provides for delivery of adaptive bit rate (ABR) video content from content providers to a requesting client. The requested video content can then be provided in a smooth manner that reduces congestion and retransmissions. The methods described herein are robust relative to an underlying transmission control protocol (TCP) configuration, and improves overall video quality for the user.

This methods described herein can be applied cooperatively at a network provider's optimization server and at a requesting client in a way where the endpoints cooperate, or in cooperation with a third-party proxy content server that operates transparently to the endpoints. The methods described herein also work with the conventional methodology for providing adaptive bit rate video streams. The conventional methodology for providing adaptive bit rate video streams is generally described herein as option 1, and uses multiple bitrate encodings, where each bitrate encoding is stored in a separate file on a server. In option 1, each file (i.e. bitrate) is partitioned into chunks of equal duration across all files, i.e. 2, 5, or 10 second chunks. Depending on the encoding scheme, chunk size in bytes may vary within the same encoding. The requesting client requests consecutive chunks from the server using HTTP, such that each chunk may have the same or different encoding bitrate and is thus adaptive in nature. During steady state, chunks are requested periodically from the server, where the period equals chunk duration (e.g. 10 seconds). Each chunk is delivered as fast as possible over HTTP/TCP, followed by an idle interval until the next period starts and the new chunk is requested. The requesting client estimates available bandwidth using the achieved throughput at the application layer during the chunk download. Again, this is the description of the conventional methodology for using adaptive bit rate in downloading video content over a mobile network, where underestimating or overestimating the available bandwidth leads to requests for requests that are either too slow (bitrate too low) or too fast (bitrate too high).

However, the requesting client estimates available bandwidth based on how much/how fast data is being received. If the requesting client overestimates or underestimates available bandwidth, chunk requests are requested at a bitrate that is too low or too high, and this can lead to poor user experience with either low quality video or stalled video from the user's perspective. The underlying causes are interaction of the transmission control protocol with the application layer. In wireless telecommunications networks, bandwidth can rapidly vary.

The methodology described herein can provide both option 1 and the option 2 alternatively A wireless telecommunications provider server or third party content provider proxy deliver individual chunks over HTTP as a standard adaptive bit rate server does as option 1, but also can deliver as fast as possible (option 1) or paced over the time interval T (option 2).

In an example, the interval T can be requested by the client, but can also be computed by the server (or a proxy). T is computed as a time required for delivering the same chunk at one rate level higher than its encoding. For example, if a chunk is encoded at a rate R=1 Mbps, and the next available rate is 1.5 Mbps, then the chunk will be delivered at 1.5 Mbps. The rates of 1.0 Mbps and 1.5 Mbps may be two of 5 (five) or more possible rates implemented for downloads by a wireless telecommunications provider. The actual implementation of the rates may be controlled by the wireless telecommunications provider that provides the wireless telecommunications network, but may alternatively be controlled by the content provider when, for example, the content provider is not the wireless telecommunications network.

The requesting client device may run an adaptive bitrate algorithm when option 1 or option 2 described herein are used. The adaptive bitrate algorithm is run repeatedly (constantly) to estimate bandwidth in order to adapt to network conditions. Using the interval T, a chunk of video can be provided to the requesting client, and when the chunk is successfully delivered within interval T the requesting client can recognize that the encoding/download rate can be increased for the next chunk. Of course, if a requesting client requests delivery of a chunk in an interval T and the chunk of video content is not delivered in the interval T, this can signal to the requesting client that a lower encoding rate should be used such that a higher accompanying interval T should be set for the next chunk.

The client uses the delivery rate in the operation of an adaptive bit rate algorithm, as the client repeatedly probes for available bandwidth in order to adapt to network conditions. Successful delivery at one rate higher signals the requesting client that it may raise the delivery rate, as opposed to staying at the same or reducing the rate. For example, if a chunk is delivered at a rate lower than expected, a lower encoding rate is likely to be requested next for the next chunk. This mechanism preserves the rate adaptation ability of the requesting client, which is the best point to estimate available bandwidth.

Additionally, in wireless networks with radio resource management (e.g. cellular) service, requesting client devices change state from active to idle to conserve energy and radio resources. Promotion from idle to active state can be lengthy in some networks, e.g. 400 ms in LTE, or up to 2.5 seconds in UMTS. This can cause a problem when the TCP connection goes idle after downloading a chunk, even a few seconds of inactivity, because the idle state will cause the radio state transition to idle. Once the application used to request delivery issues an HTTP request and starts measuring throughput, the state promotion will delay request delivery and impact bandwidth estimation, ultimately resulting in a reduced video quality for the user. The herein-contained disclosure solves this by smoothing the chunk delivery to extend over interval T and thereby reducing the chance of radio state transition to idle. That is, using the interval T can specifically avoid a period of inactivity that can occur when a chunk is delivered as fast as possible without another chunk immediately following. The interval T cam be used to ensure a smoother delivery than providing the chunk in bursts as fast as possible.

Another problem avoided using the herein-contained teachings is the consequence of TCP inactivity which triggers slow start upon resume, leading also to bandwidth underestimation. When the server(s) described herein execute the methods described herein, the slow start upon resume can be turned off as a TCP feature. When slow start upon resume is applied at a proxy video content server, the feature can be turned off since the proxy to server connection is assumed to have lower latency than proxy to client connection. Smooth delivery over period T then helps with mitigating the issue of slow start even when it has to remain enabled for a length of time reason.

One more concern addressed by the present teachings is that in some cases, video content servers do not publicize bitrates, movie names, or filenames of stored media. This might be the case where a content server or a content delivery network is outside of the wireless telecommunications network operator's control and/or where our method is to be applied at the proxy. If relevant media information cannot be obtained, the methodologies described herein can use, for example, standard HTTP live streaming (HLS) components to derive the relevant media information. The methodologies can alternatively derive media information from, for example, Microsoft Smooth Streaming, Adobe HTTP Dynamic Streaming (HDS), or Dynamic Adaptive Streaming over HTTP (DASH). For example, a content network provider's streams to mobile devices over a cellular network may include an audio stream encoded at a single rate, e.g., 64 Kbps or a similar low rate. Video streams have typically between three (3) and fifteen (15) encoding levels for mobile devices. Video streams may have three (3) or more encoding levels for smartphones, and additional encoding levels for tablets and larger devices. Using URL parsing, a proxy can determine which streams carry audio (using HTTP Content-type header or filename ends with .aac or another common extension), and derive video duration from the HTTP response Content-Range header, which contains file size, by dividing file size with audio encoding bitrate. The duration is used to derive encoding bitrate of each identified video encoding layer from URLs requesting video chunks (using HTTP Content-type header or filename ends with .ts, mp4 or another common extension), by dividing file size for each encoding layer with the video duration. The encoding bit rate can then be used to determine delivery rate, for example one level higher than the encoding rate. This approach solves the problem of identifying audio and video streams and allows smooth delivery of chunks from a proxy, such as an Ericsson Multi-Service Proxy.

By accurately estimating available bandwidth, video quality for the user is improved, compared to a standard case where frequent underestimation occurs. Additionally, congestion is reduced by smoothing out chunk delivery and avoiding buffer overruns at the end of TCP slow start. This results in traffic reduction over core and radio links. The proxy-based solutions described herein are transparent to both servers and clients. Additionally, the solutions described herein are compatible with NAT and firewall since the proxy can be deployed within the mobile network and use HTTP.

Although wireless video download rate optimization has been described with reference to several exemplary embodiments, it is understood that the words that have been used are words of description and illustration, rather than words of limitation. Changes may be made within the purview of the appended claims, as presently stated and as amended, without departing from the scope and spirit of wireless video download rate optimization in its aspects. Although wireless video download rate optimization has been described with reference to particular means, materials and embodiments, wireless video download rate optimization is not intended to be limited to the particulars disclosed; rather wireless video download rate optimization extends to all functionally equivalent structures, methods, and uses such as are within the scope of the appended claims.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards such as HTTP, HLS, MSP and LTE represent examples of the state of the art. Such standards are periodically superseded by more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In accordance with an aspect of the present application, a method of optimizing wireless video download rate includes receiving, at a system with a computer that includes a processor and memory, a request to provide a piece of video content over a wireless network. The processor of the computer is used to determine whether to provide the video content at a first option that is as soon as possible or at a second option over a specified interval T calculated as a time for a destination device to download the video content at a rate level higher than encoding for the video content requires. Upon determining to provide the video content over the interval T, the video content is provided over the wireless network over the interval T to a client device that requested the piece of video content.

In accordance with another aspect of the present disclosure, the video content is provided over the wireless network to a receiving device that estimates bandwidth availability. The first option to provide the video content as soon as possible is to provide the video content at a maximum available rate based on the estimate of bandwidth availability.

In accordance with yet another aspect of the present disclosure, the estimate of bandwidth availability is based on throughput of video content already received by the device over the wireless network.

In accordance with still another aspect of the present disclosure, the method includes calculating the interval T.

In accordance with another aspect of the present disclosure, the method includes varying the rate level based on network demand imposed on the wireless network.

In accordance with yet another aspect of the present disclosure, the method includes varying the rate level based on a profile of the device that receives the video content.

In accordance with still another aspect of the present disclosure, the rate level is determined without using a client estimate of bandwidth availability.

In accordance with another aspect of the present disclosure, the rate level is determined without using a client estimate of bandwidth availability.

In accordance with yet another aspect of the present disclosure, the interval T is calculated by the client device.

In accordance with still another aspect of the present disclosure, the interval T is calculated by a proxy system from which the video content is obtained.

In accordance with another aspect of the present disclosure, the method further includes coordinating the determining with the client device.

In accordance with yet another aspect of the present disclosure, the method includes coordinating the determining with a proxy from which the video content is obtained.

In accordance with still another aspect of the present disclosure, the method includes coordinating the determining with a proxy from which the video content is obtained.

In accordance with another aspect of the present disclosure, the rate level is enforced by a proxy from which the video content is obtained.

In accordance with yet another aspect of the present disclosure, the rate level is enforced by the system that provides the video content over the wireless network.

In accordance with still another aspect of the present disclosure, the wireless network is a wide area network implemented by a telecommunications carrier.

In accordance with another aspect of the present disclosure, the wireless network is a long-term evolution wireless network.

In accordance with yet another aspect of the present disclosure, the wireless network is a universal mobile telecommunications system wireless network.

In accordance with an aspect of the present disclosure, a tangible computer readable storage medium stores a computer program. When executed by a processor, the computer program causes a computer apparatus to perform a process. The process includes receiving, at a system with a computer that includes a processor and memory, a request to provide a piece of video content over a wireless network. The process also includes determining, using the processor of the computer, whether to provide the video content at a first option that is as soon as possible or at a second option over a specified interval T calculated as a time for a destination device to download the video content at a rate level higher than encoding for the video content requires. Upon determining to provide the video content over the interval T, the video content is provided over the wireless network over the interval T to a client device that requested the piece of video content.

In accordance with an aspect of the present disclosure, a computer apparatus includes a memory that stores instructions, and a processor that executes the instructions. When executed by the processor, the instructions cause the processor to perform operations. The operations include receiving, at a system with a computer that includes a processor and memory, a request to provide a piece of video content over a wireless network. The processor of the computer is used to determine whether to provide the video content at a first option that is as soon as possible or at a second option over a specified interval T calculated as a time for a destination device to download the video content at a rate level higher than encoding for the video content requires. Upon determining to provide the video content over the interval T, the video content is provided over the wireless network over the interval T to a client device that requested the piece of video content.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of optimizing wireless video download rates, comprising:
receiving, at a system with a computer that includes a processor and memory, a request to provide a video file over a wireless network;
determining, by the processor, an encoding rate required by the video file;
determining, by the processor, a download rate at a time of the request;
determining, by the processor, whether or not the download rate level is higher than the encoding rate at the time of the request;
when the download rate level is determined to be higher than the encoding rate at the time of the request, providing the video file as soon as possible;
when the download rate level is not determined to be higher than the encoding rate at the time of the request, calculating a specified interval T when the download rate level is expected to be higher than the encoding rate to download the video file; and
providing the video file over the wireless network over the interval T to a client device that requested the video file.

2. The method of claim 1,
wherein the video file is provided over the wireless network to a receiving device that estimates bandwidth availability, and
wherein the providing of the video file as soon as possible includes providing the video file at a maximum available rate based on an estimate of bandwidth availability.

3. The method of claim 2,
wherein the estimate of bandwidth availability is based on throughput of a portion of the video file already received by the client device over the wireless network.

4. The method of claim 1, further comprising:
calculating the interval T.

5. The method of claim 1, further comprising:
varying the download rate level based on network demand imposed on the wireless network.

6. The method of claim 1, further comprising:
varying the download rate level based on a profile of the client device that receives the video file.

7. The method of claim 6,
wherein the download rate level is determined without using a client estimate of bandwidth availability.

8. The method of claim 1,
wherein the download rate level is determined without using a client estimate of bandwidth availability.

9. The method of claim 1,
wherein the interval T is calculated by the client device.

10. The method of claim 1,
wherein the interval T is calculated by a proxy system from which the video file is obtained.

11. The method of claim 1, further comprising:
coordinating a timing for providing the video file with the client device.

12. The method of claim 11, further comprising:
coordinating a timing for providing the video file with a proxy from which the video file is obtained.

13. The method of claim 1, further comprising:
coordinating a timing for providing the video file with a proxy from which the video file is obtained.

14. The method of claim 1,
wherein the download rate level is enforced by a proxy from which the video file is obtained.

15. The method of claim 1,
wherein the download rate level is enforced by the system that provides the video file over the wireless network.

16. The method of claim 1,
wherein the wireless network is a wide area network implemented by a telecommunications carrier.

17. The method of claim 16,
wherein the wireless network is a long-term evolution wireless network.

18. The method of claim 16,
wherein the wireless network is a universal mobile telecommunications system wireless network.

19. A tangible computer readable storage medium that stores a computer program, the computer program, when executed by a processor, causing a computer apparatus to perform a process comprising:
receiving, at a system with a computer that includes a processor and memory, a request to provide a piece of video file over a wireless network;
determining, by the processor, an encoding rate required by the video file;
determining, by the processor, a download rate at a time of the request;
determining, by the processor, whether or not the download rate level is higher than the encoding rate at the time of the request;
when the download rate level is determined to be higher than the encoding rate at the time of the request, providing the video file as soon as possible;
when the download rate level is not determined to be higher than the encoding rate at the time of the request, calculating a specified interval T when the download rate level is expected to be higher than the encoding rate to download the video file, and
providing the video file over the wireless network over the interval T to a client device that requested the video file.

20. A computer apparatus, comprising:
a memory that stores instructions, and
a processor that executes the instructions,
wherein, when executed by the processor, the instructions cause the processor to perform operations comprising:
receiving, at a system with a computer that includes a processor and memory, a request to provide a video file over a wireless network;
determining, by the processor, an encoding rate required by the video file;
determining, by the processor, a download rate at a time of the request;
determining, by the processor, whether or not the download rate level is higher than the encoding rate at the time of the request;
when the download rate level is determined to be higher than the encoding rate at the time of the request, providing the video file as soon as possible;
when the download rate level is not determined to be higher than the encoding rate at the time of the request, calculating a specified interval T when the download rate level is expected to be higher than the encoding rate to download the video file; and
providing the video file over the wireless network over the interval T to a client device that requested the video file.

* * * * *